US007885184B2

(12) United States Patent
George et al.

(10) Patent No.: US 7,885,184 B2
(45) Date of Patent: Feb. 8, 2011

(54) METHOD AND APPARATUS FOR RE-ESTABLISHING ANONYMOUS DATA TRANSFERS

(75) Inventors: David A. George, Somers, NY (US); Raymond B. Jennings, III, Ossining, NY (US); Jason D. LaVoie, Mahopac, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 12/165,196

(22) Filed: Jun. 30, 2008

(65) Prior Publication Data

US 2008/0259789 A1 Oct. 23, 2008

Related U.S. Application Data

(63) Continuation of application No. 11/331,713, filed on Jan. 13, 2006, now abandoned.

(51) Int. Cl.
*H04L 12/26* (2006.01)
(52) U.S. Cl. .......................... 370/228; 370/242
(58) Field of Classification Search ................ 370/218, 370/225, 217, 216, 228
See application file for complete search history.

(56) References Cited

U.S. PATENT DOCUMENTS

| 7,471,625 | B2 | 12/2008 | Suemura | |
|---|---|---|---|---|
| 7,529,933 | B2* | 5/2009 | Palekar et al. | 713/168 |
| 7,558,194 | B2* | 7/2009 | Regan et al. | 370/217 |
| 7,685,073 | B2* | 3/2010 | Baker | 705/80 |
| 7,783,762 | B2* | 8/2010 | Vincent | 709/227 |
| 7,783,777 | B1* | 8/2010 | Pabla et al. | 709/238 |
| 2003/0041141 | A1* | 2/2003 | Abdelaziz et al. | 709/223 |
| 2004/0233891 | A1* | 11/2004 | Regan et al. | 370/351 |

(Continued)

FOREIGN PATENT DOCUMENTS

WO   WO 2005/086411   9/2005

OTHER PUBLICATIONS (WO/2005/086411) Method for veryifying and building highly safe anonynomous sales route in Peer-to-Peer anonymous Proxy (English Translation). Published Feb. 21, 2005. by Nishida et al.*

*Primary Examiner*—Michael J Moore, Jr.

(57) ABSTRACT

One embodiment of the present method and apparatus for re-establishing anonymous data transfers between a first endpoint and a second endpoint in a network includes receiving, from a first node, the identity of a second node connected to the first node, where at least the first node is a neighbor node. A third node (a neighbor node) is then selected, and instructed to connect to the second node in order to establish a link for the path. In this manner, the first endpoint and the second endpoint remain unknown at least to each other (e.g., where "unknown" means that neither endpoint knows any identifying information, such as network address, about the other endpoint), and likely to all other nodes in the path as well. In another embodiment, a failure is detected at a neighbor node, where the neighbor node is part of an original path between the first endpoint and the second endpoint. The neighbor node's repair server is contacted for a repair node associated with the neighbor node, and a connection to the repair node is made such that the path is established in a manner that maintains anonymity of the first endpoint and the second endpoint relative to each other.

20 Claims, 8 Drawing Sheets

U.S. PATENT DOCUMENTS

2005/0108593 A1* 5/2005 Purushothaman et al. ...... 714/4
2006/0023646 A1 2/2006 George
2006/0023727 A1 2/2006 George
2006/0098608 A1* 5/2006 Joshi .......................... 370/338
2006/0155997 A1* 7/2006 Fritzges et al. .............. 713/171
2006/0198367 A1 9/2006 Lee et al.
2006/0280191 A1 12/2006 Nishida et al.

* cited by examiner

METHOD AND APPARATUS FOR RE-ESTABLISHING ANONYMOUS DATA TRANSFERS

CROSS REFERENCE TO RELATED APPLICATIONS

This application is a continuation of U.S. patent application Ser. No. 11/331,713, filed Jan. 13, 2006, now abandoned entitled "METHOD AND APPARATUS FOR RE-ESTABLISHING ANONYMOUS DATA TRANSFERS", which is herein incorporated by reference in its entirety.

BACKGROUND

The present invention relates generally to computing networks and relates more particularly to anonymous data transfers between computing devices.

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to one or more intermediate network nodes 111 connected to the requesting node 101. Each intermediate node 111 receives the search message 105 and then forwards the search message 105 to one or more additional nodes 111. Eventually, the search message 105 reaches one or more responding nodes 103 having the requested data. One or more responding nodes 103 then send a response message 107 back to the requesting node 101, e.g., via the intermediate nodes 111. The requesting node 101 then requests the relevant data from a responding node 103 by connecting directly to the responding node 103, e.g., via direct connection 109.

In conventional P2P systems, both the requesting node 101 and the responding node 103 are aware of the other's identity such that one node has some unique information about the other node (e.g., a network address). Intermediate nodes may likewise be aware of the identities of the requesting node 101 and/or the responding node 103, depending on what type of identification is contained within the search and response messages 105 and 107. In many instances, however, one or both of the requesting node 101 and the responding node 103 may not wish to have their identities known to other nodes. Unfortunately, most conventional anonymous transfer methods, such as static anonymizing services, may be easily compromised, revealing the identities of transferring parties and/or causing a denial of service. Other methods for preserving the identity of the transferring parties typically involve encrypting the transferred files such that their contents are unknown. However, searching content using standard text for file names becomes impractical, and users typically must know specific public keys for desired data, making key distribution a network bottleneck. Moreover, most typical methods for establishing anonymous data transfer paths between two nodes do not provide a way for re-establishing the anonymous path should the connection between the two nodes be broken (e.g., due to a compromised path or to failure of a node on the path).

Thus, there is a need in the art for a method and apparatus for re-establishing anonymous data transfers.

SUMMARY OF THE INVENTION

One embodiment of the present method and apparatus for re-establishing anonymous data transfers between a first endpoint and a second endpoint in a network includes receiving, from a first node, the identity of a second node connected to the first node, where at least the first node is a neighbor node. A third node (a neighbor node) is then selected and instructed to connect to the second node in order to establish a link for the path. In this manner, the first endpoint and the second endpoint remain unknown at least to each other (e.g., where "unknown" means that neither endpoint knows any identifying information, such as network address, about the other endpoint), and likely to all other nodes in the path as well. In another embodiment, a failure is detected at a neighbor node, where the neighbor node is part of an original path between the first endpoint and the second endpoint. The neighbor node's repair server is contacted for a repair node associated with the neighbor node, and a connection to the repair node is made such that the path is established in a manner that maintains anonymity of the first endpoint and the second endpoint relative to each other.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for re-establishing connections or paths for anonymous data transfers. Embodiments of the present invention enable paths between two anonymous nodes (i.e., anonymous at least to each other) to be re-established in the event that a previously established path fails before a data transfer is completed (e.g., due to failure of a node in the path or to the path becoming compromised, where a path is compromised if one or both of the anonymous nodes learns the identity of the other). Within the context of the present invention, a first node is "anonymous" or "unknown" to a second node if the second node does not know any identifying information (e.g., network address) about the first node. Paths may be re-established in a manner that maintains a substantially equivalent level of anonymity and avoids restarting the (potentially large) data transfer, which can be time consuming.

Embodiments of the present invention are particularly well-suited for re-establishing an anonymous path between a requesting node and a responding node, where the path includes one or more intermediate or "relay" nodes that aid in the data transfer such that the requesting node and the responding node do not connect directly to each other. Methods for establishing such an initial anonymous path using relay nodes have been discussed in co-pending, commonly assigned U.S. patent application Ser. Nos. 10/903,531 and 10/909,024, both filed Jul. 30, 2004, and both of which are herein incorporated by reference in their entireties.

It is possible that in the course of time, the ability of one or more relay nodes to participate in an anonymous data transfer may be compromised (e.g., by external attack or collusion of other nodes to reveal the identities of the requesting and responding nodes). In such a case, it may be necessary to re-establish an anonymous path between the requesting node and the responding node, omitting at least the compromised relay node. Furthermore, it is desirable to define a new path that affords substantially the same degree of anonymity (e.g., no additional identities or information revealed) as the old path.

Figure 1:
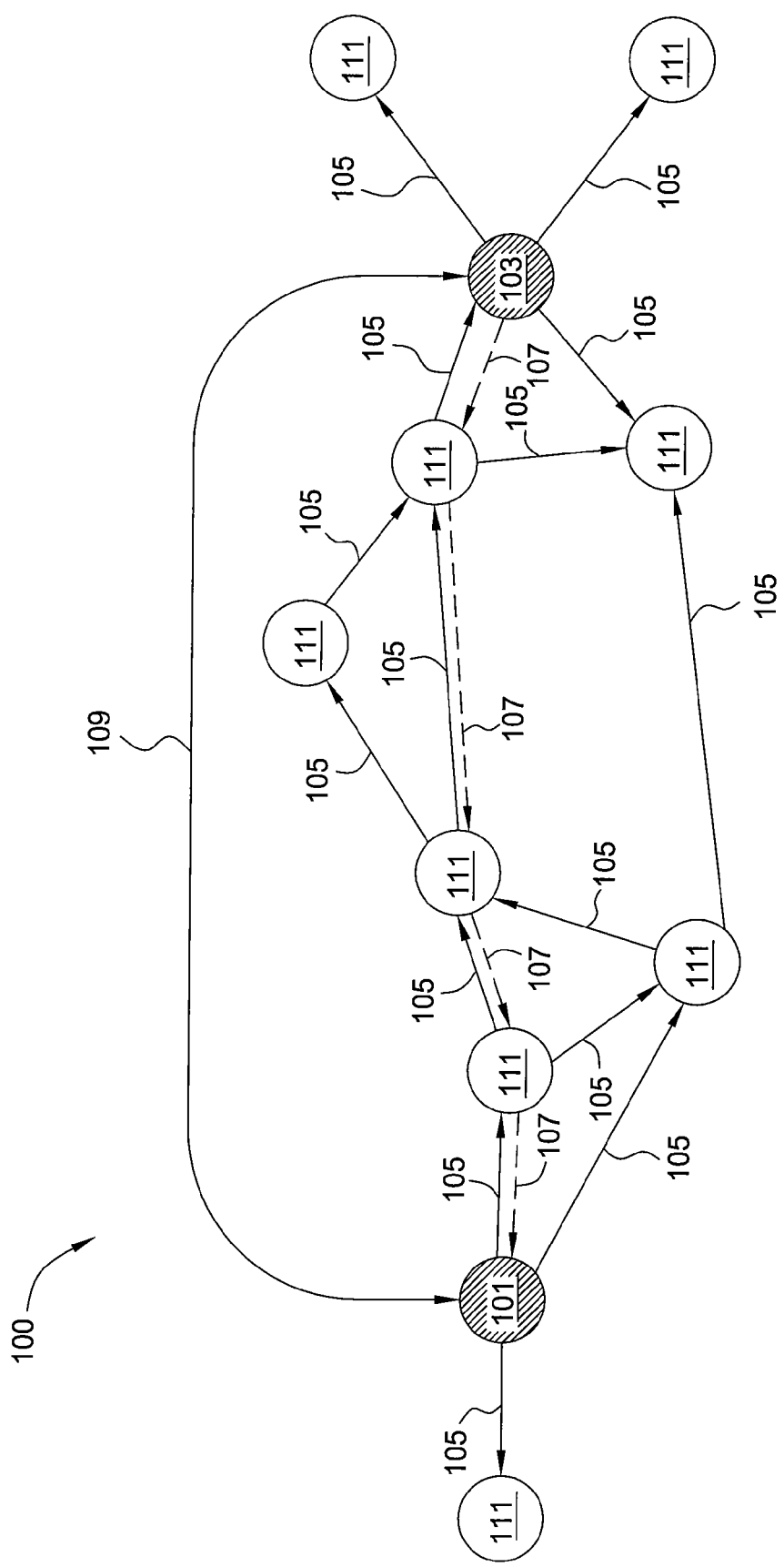
FIG. 1 is a schematic diagram of a network of nodes interacting in a peer-to-peer manner.
Figure 2:
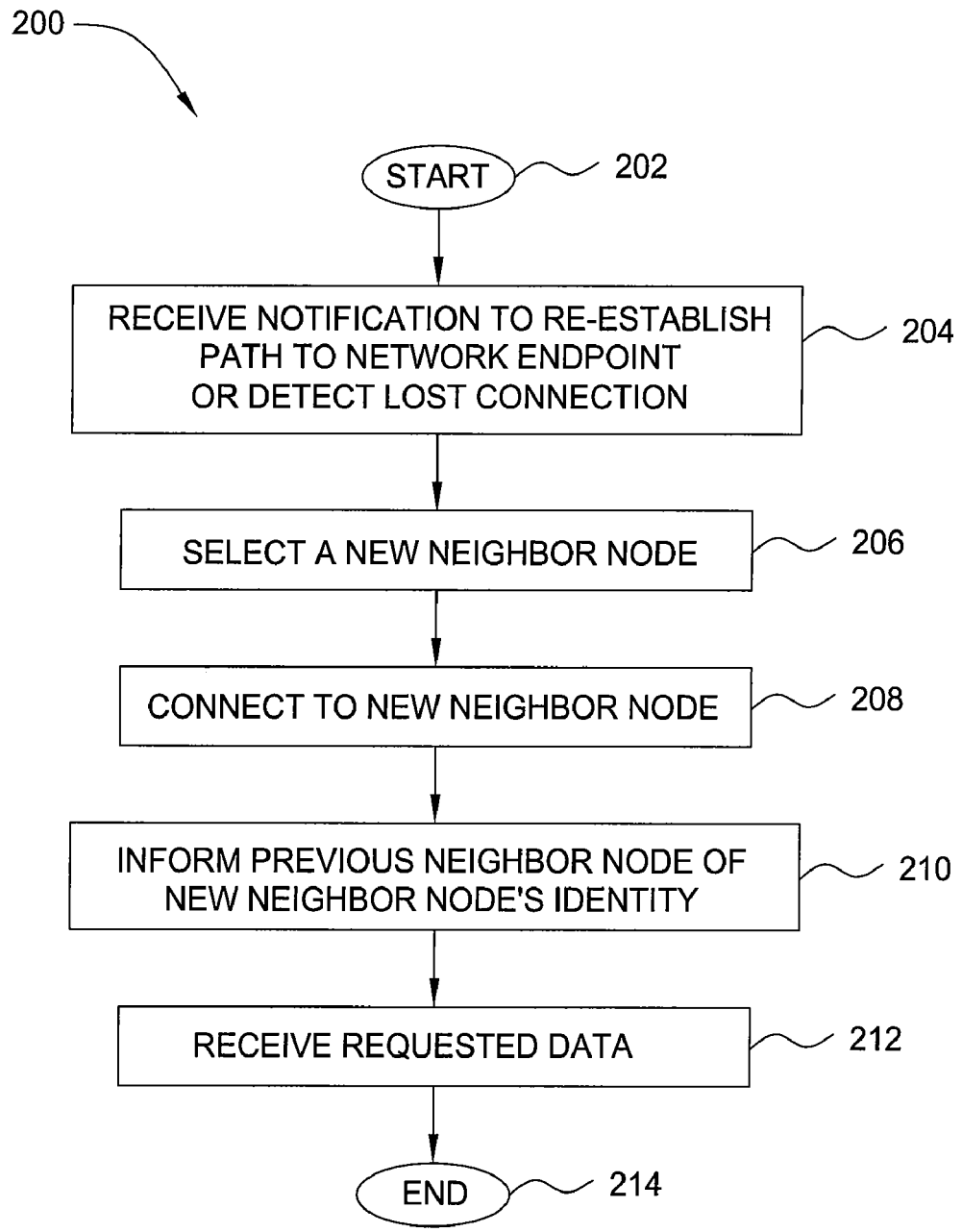
FIG. 2 is a flow diagram illustrating one embodiment of a method for re-establishing a path between a requesting node and a responding node that maintains the anonymity of both parties, according to the present invention.

FIG. 2 is a flow diagram illustrating one embodiment of a method 200 for re-establishing a path between a requesting node and a responding node that maintains the anonymity of both parties, according to the present invention. The method 200 may be implemented, for example, at a node that is an endpoint in an anonymous data transfer (e.g., a requesting node or a responding node).

The method 200 is initialized at step 202 and proceeds to step 204, where the method 200 receives a notification to re-establish a path to a network endpoint (e.g., due to a failure of an intermediate or relay node in the previous path) or simply detects on its own that the existing path or connection has been lost. For example, if the method 200 is executing at the requesting node, the notification informs the method 200 of the need to re-establish a path to the responding node.

In step 206, the method 200 selects a new neighbor node in response to the notification received in step 204 (e.g., to replace the previous neighbor node in the previous path). In one embodiment, the method 200 selects this new neighbor node autonomously. In another embodiment, the new neighbor node is selected by a management node. The method 200 then connects to the selected new neighbor node in step 208. Thus, steps 206 and 208 succeed in establishing a first link in a new path between the requesting node and the responding node.

In step 210, the method 200 informs the previous neighbor node of the new neighbor node's identity. The method 200 then waits in step 212 to send or receive the requested data (e.g., once the path has been fully re-established), depending on whether the node at which the method 200 is executing is a requesting node or a responding node. In step 214, the method 200 terminates.

Figure 3:
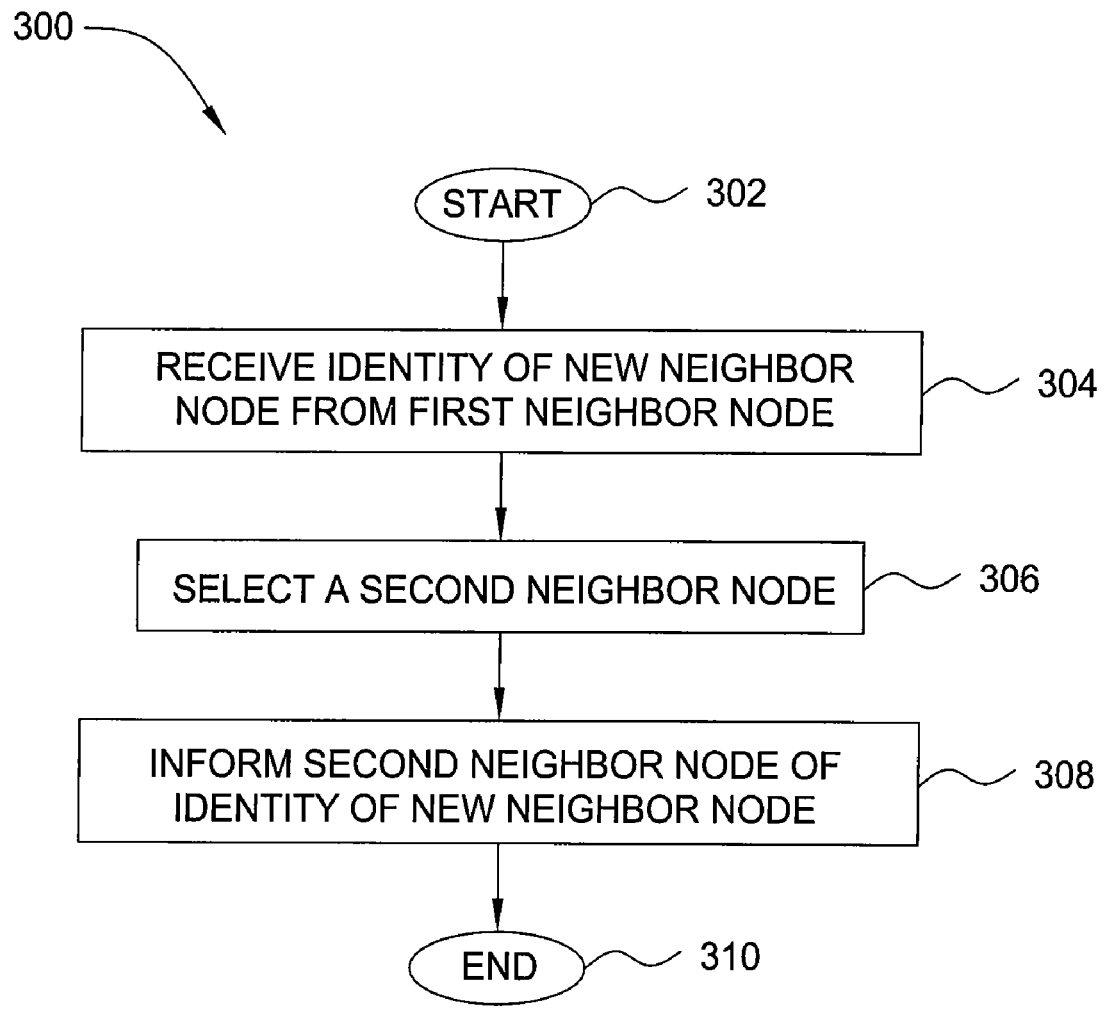
FIG. 3 is a flow diagram illustrating another embodiment of a method for re-establishing a path between a requesting node and a responding node that maintains the anonymity of both parties, according to the present invention.

FIG. 3 is a flow diagram illustrating another embodiment of a method 300 for re-establishing a path between a requesting node and a responding node that maintains the anonymity of both parties, according to the present invention. The method 300 may be implemented, for example, at an intermediate or relay node in the previous or failed path between the requesting node and the responding node.

The method 300 is initialized at step 302 and proceeds to step 304, where the method 300 receives the identity of a new neighbor node from a first neighbor node in the previous path. That is, the first neighbor node, having selected a new neighbor node (e.g., in accordance with step 210 of the method 200), informs the node at which the method 300 is executing of the selection of the new neighbor node.

In step 306, the method 300 selects a second neighbor node in response to the notification received in step 306. The method 300 then proceeds to step 308 and informs the selected second neighbor node of the identity of the new neighbor node (e.g., so that the second neighbor node may connect to the new neighbor node). In this way, the method 300 enables a link of a new path between the requesting and responding nodes to be established, without disclosing the identity of either the requesting node or the responding node.

Figure 4:
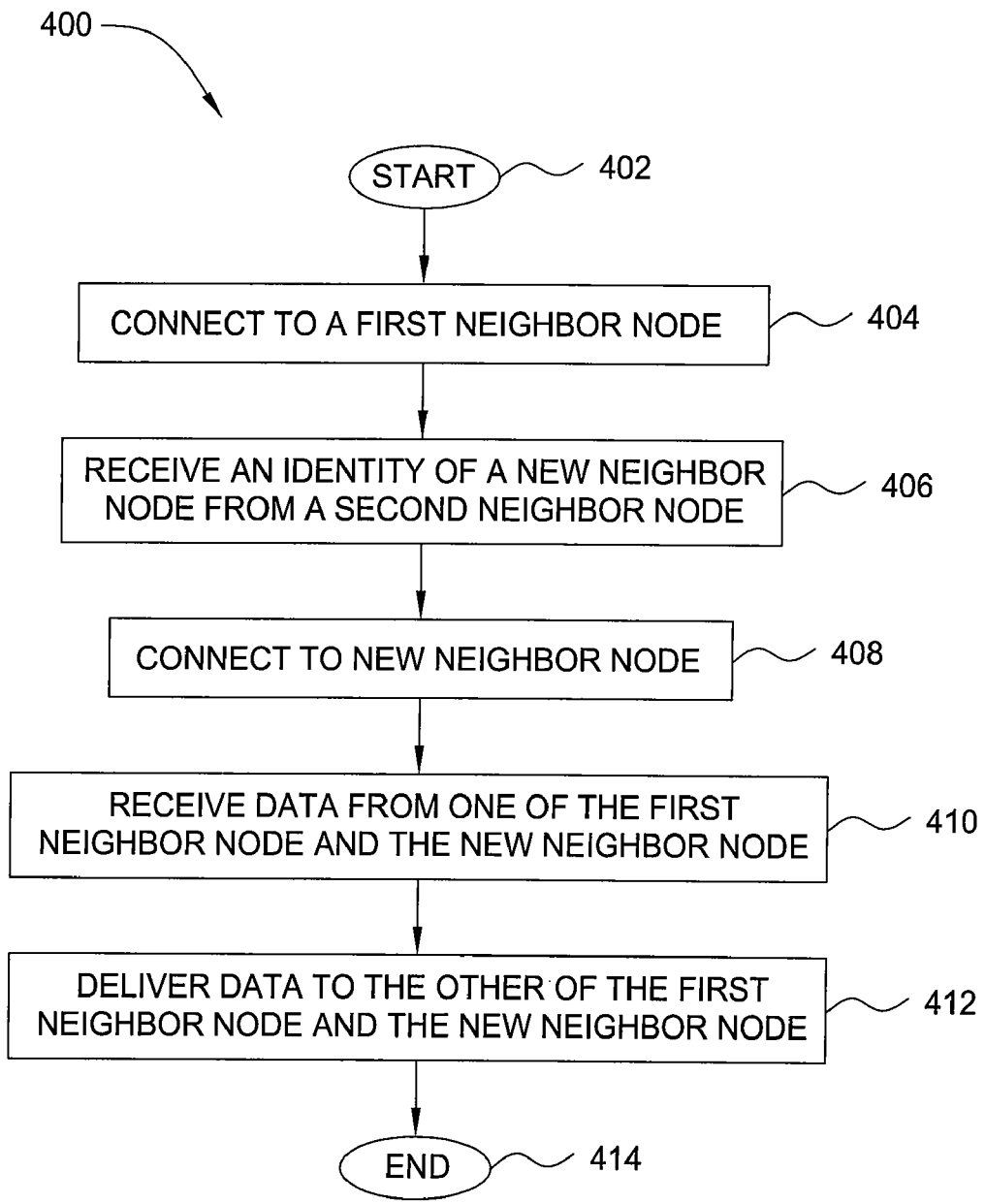
FIG. 4 is a flow diagram illustrating another embodiment of a method for re-establishing a path between a requesting node and a responding node that maintains the anonymity of both parties, according to the present invention.

FIG. 4 is a flow diagram illustrating another embodiment of a method 400 for re-establishing a path between a requesting node and a responding node that maintains the anonymity of both parties, according to the present invention. The method 400 may be implemented, for example, at a newly selected intermediate or relay node in a developing new path between the requesting node and the responding node (e.g., at the new neighbor node of the method 200, or the new neighbor node or second neighbor node of the method 300).

The method 400 is initialized at step 402 and proceeds to step 404, where the method 400 connects to a first neighbor node. This connection may be made, for example, in response to the first neighbor node selecting the node at which the method 400 is executing (e.g., in accordance with steps 206-208 of the method 200) or in response to a notification from a previous neighbor node identifying a new neighbor node (e.g., in accordance with step 308 of the method 300).

In step 406, the method 400 receives an identity of a new neighbor node from a second neighbor node (e.g., the second neighbor node informs the method 400 of the selection of a new neighbor node for the node at which the method 400 is executing). The method 400 then connects to the new neighbor node in step 408.

In step 410, the method 400 receives data from one of the first neighbor node and the new neighbor node (e.g., depending on the direction of the data transfer between the requesting node and the responding node). The method 400 then delivers the data to the other of the first neighbor node and the new neighbor node (e.g., the one from which the data was not received in step 410) in step 412. In step 414, the method 400 terminates.

Figure 5:
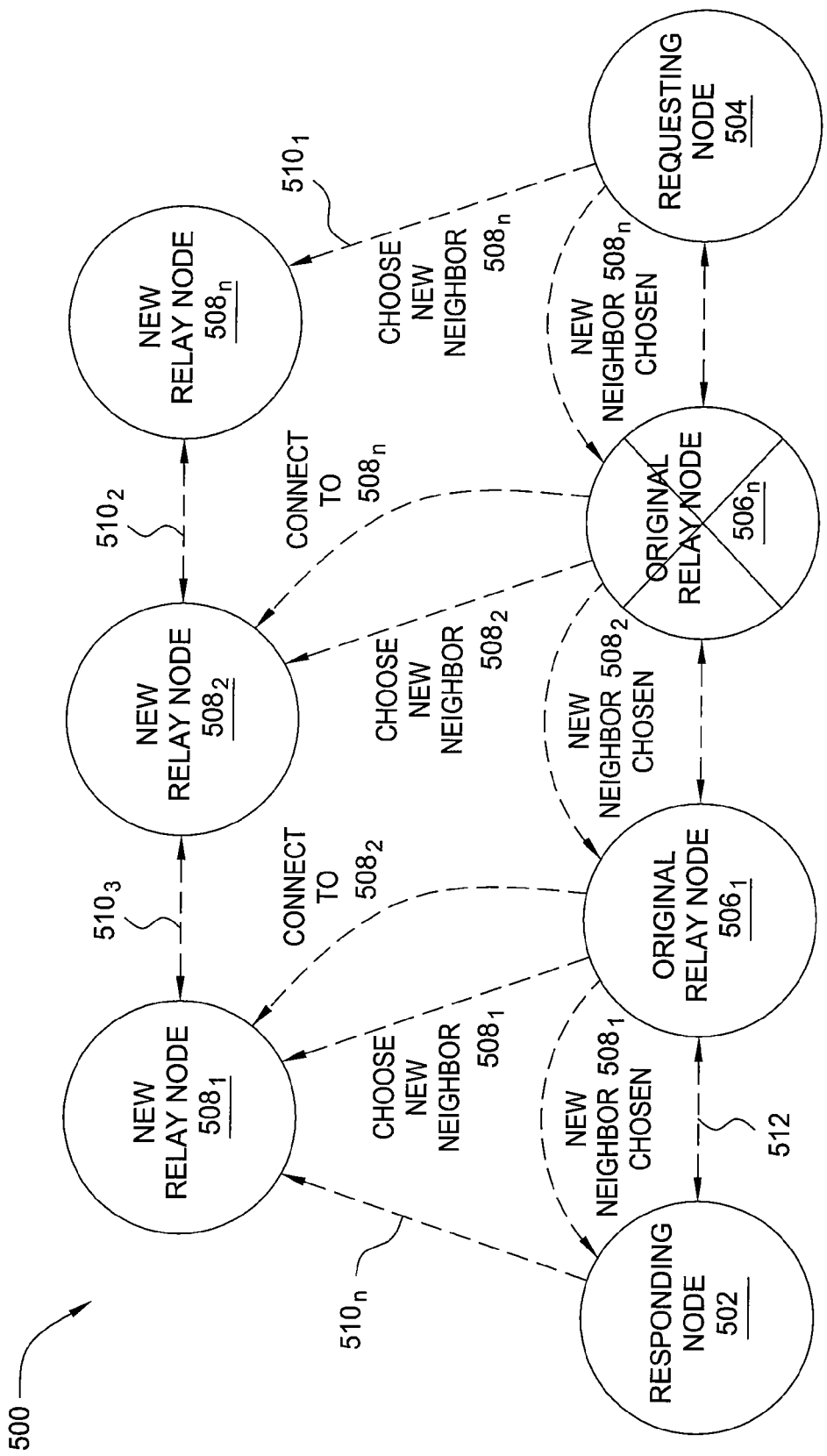
FIG. 5 is a schematic diagram illustrating the cooperative operation of the methods of FIGS. 2-4 to re-establish an anonymous path between a requesting node and a responding node.

FIG. 5 is a schematic diagram illustrating the cooperative operation of the methods 200, 300 and 400 to re-establish an anonymous path between a requesting node and a responding node. As illustrated, an original path 512 (illustrated as a solid line) through a network 500 from a responding node 502 to a requesting node 504 includes one or more original relay nodes $506_1$-$506_n$ (hereinafter collectively referred to as "original relay nodes 506") that assist in preserving the identities of the responding node 502 and the requesting node 504, as discussed, for example, in connection with the methods described in U.S. patent application Ser. No. 10/909,024. However, when the original path 512 can no longer be used, for example because one of the original relay nodes (e.g., original relay node $506_n$) fails, a new path must be established between the responding node 502 and the requesting node 504 that affords substantially the same level of anonymity as the original path 512.

In accordance with the method 200 described above, the requesting node 504 selects and connects to a new neighbor node, thereby establishing a first link $510_1$ in a new path (illustrated in phantom) between the requesting node 504 and the responding node 502. This new neighbor node is new relay node $508_n$. The requesting node 504 then informs its original neighbor node, original relay node $506_n$, of the selection of the new relay node $508_n$.

In accordance with the method 300 described above, the original relay node $506_n$ in turn selects a new neighbor node, new relay node $508_2$. The original relay node $506_n$ then informs the new relay node $508_2$ of the new neighbor node selected by the requesting node 504 (e.g., new relay node $508_n$).

In accordance with the method 400, the new relay node $508_2$ selected by the original relay node $506_n$ then connects to the new relay node $508_n$ selected by the requesting node 504, thereby establishing a second link $510_2$ in a new path between the requesting node 504 and the responding node 502.

This process continues to establish new links $510_1$-$510_n$ (hereinafter collectively referred to as "new links 510") until a final new link $510_n$ is established connecting the responding node 502 to one of the new relay nodes, new relay node $508_1$. Thus, a new path comprising new links 510 is established between the requesting node 504 and the responding node 502. Moreover, because each new relay node $508_1$-$508_n$ (hereinafter collectively referred to as "new relay nodes 508") only knows the identity of its neighboring new relay nodes 508 and of the original relay node 506 that selected it, the anonymity of the requesting node 504 and the responding node 502 is preserved as well as if the original path 512 were still intact. Even those new relay nodes 508 that connect directly to requesting node 504 or the responding node 502 do not know that their neighboring node is an endpoint of the data transfer taking place.

Those skilled in the art will appreciate that the each of the links of the original path 512 does not necessarily have to be replaced with new links 510. That is, there is not necessarily a one-to-one correspondence between links of the original path 512 and new links 510. A new link 510 may serve to replace multiple links of the original path 512, or a single link of the original path 512 may be replaced with multiple new links 510. Moreover, one or more of the links in the original path 512 could be reused in re-establishing the path between the requesting node 504 and the responding node 502.

Figure 6:
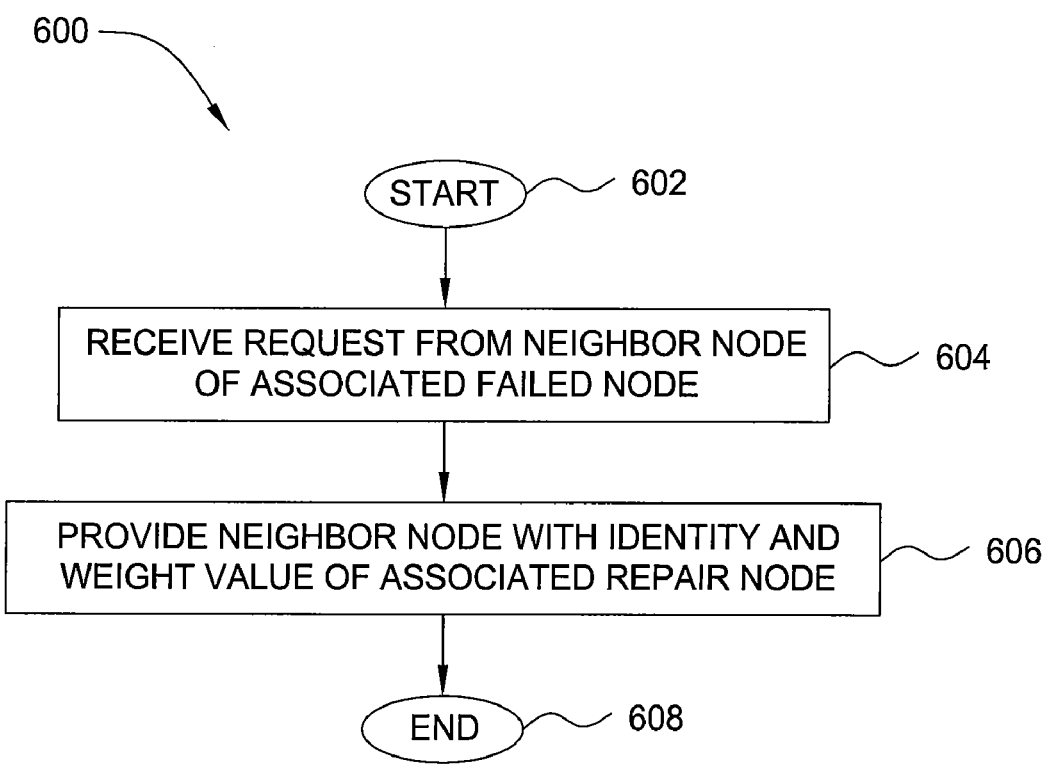
FIG. 6 is a flow diagram illustrating a second method for re-establishing a path between a requesting node and a responding node that maintains the anonymity of both parties, according to the present invention.

FIG. 6 is a flow diagram illustrating another method 600 for re-establishing a path between a requesting node and a responding node that maintains the anonymity of both parties, according to the present invention. The method 600 may be implemented, for example, at repair server that is configured to assist a given node in re-establishing anonymous data transfer paths.

The method 600 is initialized at step 602 and proceeds to step 604, where the method 600 receives a request from a neighbor node of a node with which the repair server is associated. The request indicates that the node with which the repair server is associated has failed and asks for assistance in repairing the data transfer path including the failed node.

In step 606, the method 600 provides the neighbor node with the identity and weight value of a repair node associated with the failed node. The repair node can "fill in" for the failed node in the data transfer path. The weight value of the repair node is used, as discussed in greater detail below, to determine the order of nodes in the data transfer path. The method 600 then terminates in step 608.

Figure 7:
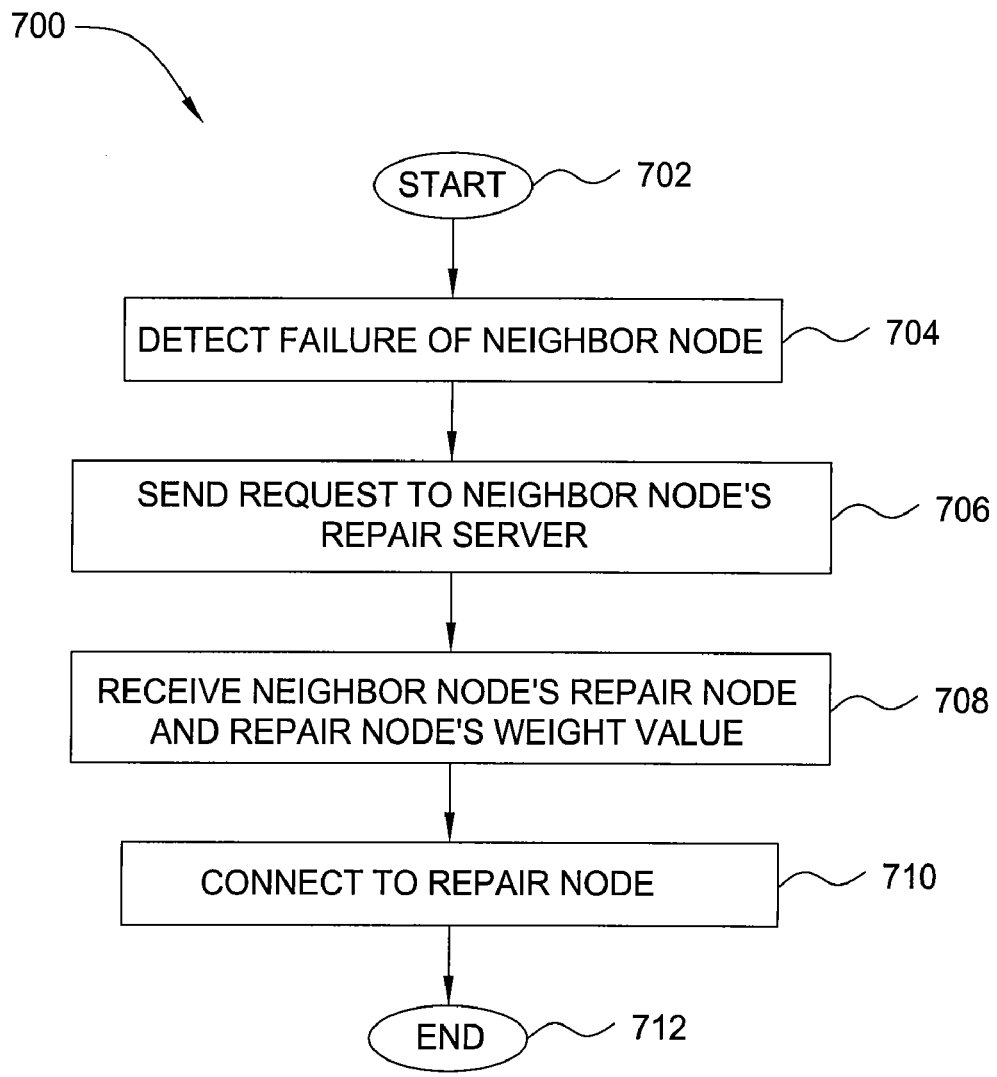
FIG. 7 is a flow diagram illustrating another embodiment of a method for re-establishing a path between a requesting node and a responding node that maintains the anonymity of both parties, according to the present invention.

FIG. 7 is a flow diagram illustrating another embodiment of a method 700 for re-establishing a path between a requesting node and a responding node that maintains the anonymity of both parties, according to the present invention. The method 700 may be implemented, for example, at neighbor node of a failed node that is associated with a repair server (as discussed with respect to FIG. 6).

The method 700 is initialized in step 702 and proceeds to step 704, where the method 700 detects the failure of a neighbor node. In step 706, the method 700 sends a request to the failed neighbor node's associated repair server, e.g., requesting a repair node to repair the data transfer path.

In step 708, the method 700 receives the identity and weight value of the failed neighbor node's repair node. The method 700 then connects to the repair node in step 710. In one embodiment, connection to the repair node is made in accordance with the associated weight value, where weight values associated with nodes increase monotonically along the original and repaired data transfer path (e.g., from left to right) from node to node.

In one embodiment, each node in a network may be associated with a different repair node. In another embodiment, each node may be associated with the same repair node.

Figure 8:
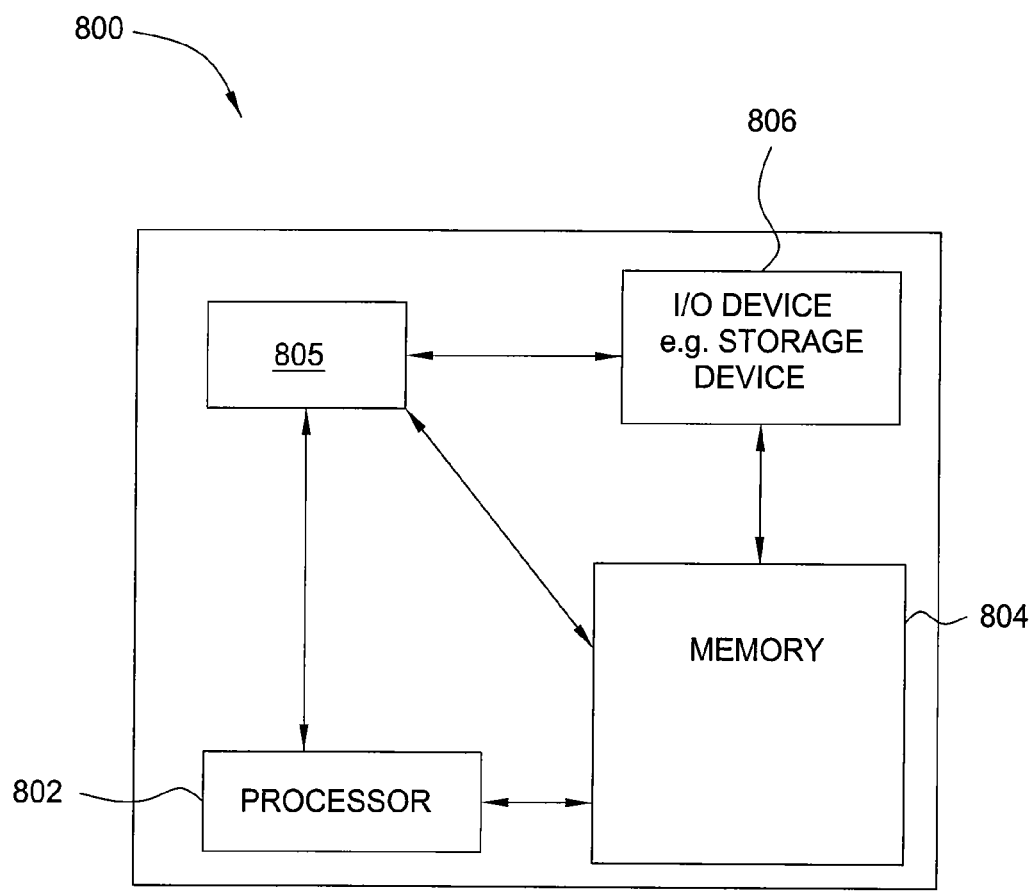
FIG. 8 is a high level block diagram of the anonymous connection re-establishment method that is implemented using a general purpose computing device.

FIG. 8 is a high level block diagram of the anonymous connection re-establishment method that is implemented using a general purpose computing device 800. In one embodiment, a general purpose computing device 800 comprises a processor 802, a memory 804, an anonymous connection re-establishment module 805 and various input/output (I/O) devices 806 such as a display, a keyboard, a mouse, a modem, and the like. In one embodiment, at least one I/O device is a storage device (e.g., a disk drive, an optical disk drive, a floppy disk drive). It should be understood that the anonymous connection re-establishment module 805 can be implemented as a physical device or subsystem that is coupled to a processor through a communication channel.

Alternatively, the anonymous connection re-establishment module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the anonymous connection re-establishment module 805 for re-establishing anonymous data transfer paths between requesting and responding nodes described herein with reference to the preceding Figures can be stored on a computer readable medium or carrier (e.g., RAM, magnetic or optical drive or diskette, and the like).

Thus, the present invention represents a significant advancement in the field of data transfer systems. A method and apparatus are provided that enable the re-establishment of anonymous data transfer paths between two nodes, without revealing the identity of the nodes requesting and responding nodes to each other or to other nodes participating in the data transfer and without re-starting the data transfer. The present invention thus accounts for the possibility of the failure of a previously established anonymous data transfer path while maintaining a level of anonymity that is substantially equivalent to that afforded by the failed data transfer path.

While foregoing is directed to the preferred embodiment of the present invention, other and further embodiments of the invention may be devised without departing from the basic scope thereof, and the scope thereof is determined by the claims that follow.

The invention claimed is:

1. A method for replacing a failed path for a transfer of data between a first endpoint and a second endpoint in a network with a new path for said transfer of data, said method comprising:
  receiving, at a first intermediate node in said failed path, an identity from a second intermediate node in said failed path of a first replacement node, where at least the second intermediate node is a neighbor node and a peer of said first intermediate node;
  selecting, by said first intermediate node, a second replacement node, said second replacement node being a neighbor node and a peer of said first intermediate node; and instructing, by said first intermediate node, said second replacement node to connect to said first replacement node in order to establish a link for said new path, where an identity of said first endpoint is unknown to said second endpoint, and an identity of said second endpoint is unknown to said first endpoint.

2. The method of claim 1, further comprising:

informing, by said first intermediate node, a third intermediate node in said failed path of said second replacement node being selected, said third intermediate node being a neighbor node and a peer of said first intermediate node.

3. The method of claim 1, wherein said identity of said first endpoint is unknown to at least one of: said first intermediate node, said second intermediate node, said first replacement node, or said second replacement node.

4. The method of claim 1, wherein said identity of said second endpoint is unknown to at least one of: said first intermediate node, said second intermediate node, said first replacement node, or said second replacement node.

5. The method of claim 1, wherein said new path uses at least one link of said failed path.

6. The method of claim 1, wherein at least said second intermediate node is part of said failed path.

7. The method of claim 1, wherein said new path requires replacement due to an unexpected termination of said failed path by a node in said failed path, before a completion of said transfer of data.

8. The method of claim 1, wherein said new path requires replacement due to at least one of: said first endpoint learning said identity of said second endpoint before a completion of said transfer of data or said second endpoint learning said identity of said first endpoint before a completion of said transfer of data.

9. A non-transitory computer program product stored on a non-transitory computer readable storage medium for replacing a failed path for a transfer of data between a first endpoint and a second endpoint in a network with a new path for said transfer of data, the non-transitory computer readable storage medium comprising program code for causing a computer system to perform steps of:

receiving, at a first intermediate node in said failed path, an identity from a second intermediate node in said failed path of a first replacement node, where at least the second intermediate node is a neighbor node and a peer of said first intermediate node;

selecting, by said first intermediate node, a second replacement node, said second replacement node being a neighbor node and a peer of said first intermediate node; and instructing, by said first intermediate node, said second replacement node to connect to said first replacement node in order to establish a link for said new path, where an identity of said first endpoint is unknown to said second endpoint, and an identity of said second endpoint is unknown to said first endpoint.

10. The non-transitory computer readable storage medium of claim 9, further comprising:

informing, by said first intermediate node, a third intermediate node in said failed path of said second replacement node being selected, said third intermediate node being a neighbor node and a peer of said first intermediate node.

11. Apparatus for replacing a failed path for a transfer of data between a first endpoint and a second endpoint in a network with a new path for said transfer of data, said apparatus comprising:

means for receiving, at a first intermediate node in said failed path, an identity from a second intermediate node in said failed path of a first replacement node, where at least the second intermediate node is a neighbor node and a peer of said first intermediate node; and means for selecting, by said first intermediate node, a second replacement node, said second replacement node being a neighbor node and a peer of said first intermediate node; and means for instructing, by said first intermediate node, said second replacement node to connect to said first replacement node in order to establish a link for said new path, where an identity of said first endpoint is unknown to said second endpoint, and an identity of said second endpoint is unknown to said first endpoint.

12. A method for replacing a failed path for a transfer of data between a first endpoint and a second endpoint in a network with a new path for said transfer of data, said method comprising:

detecting, at a first intermediate node in said failed path, a failure of a second intermediate node in said failed path, where said second intermediate node is a neighbor and a peer of said first intermediate node;

receiving, at said first intermediate node, an identity of a repair node for said second intermediate node from a repair server associated with said second intermediate node; and connecting, at said first intermediate node, to said repair node such that said new path is established in a manner that maintains anonymity of said first endpoint and said second endpoint relative to each other.

13. The method of claim 12, wherein each node in said failed path is associated with a weight value, said weight value increasing monotonically along said failed path from node to node.

14. The method of claim 13, wherein said repair node is associated with a weight value that facilitates node ordering of said new path.

15. The method of claim 12, wherein each node in said failed path is associated with a common repair node.

16. The method of claim 12, wherein each node in said failed path is associated with a different repair node.

17. The method of claim 12, wherein said failed path requires replacement due to an unexpected termination of said failed path by a node in said failed path, before a completion of said transfer of data.

18. The method of claim 12, wherein said failed path requires replacement due to at least one of: said first endpoint learning said identity of said second endpoint before a completion of said transfer of data or said second endpoint learning said identity of said first endpoint before a completion of said transfer of data.

19. The method of claim 1, wherein said first intermediate node is not said first endpoint or said second endpoint.

20. The method of claim 12, wherein neither said first intermediate node nor said second intermediate node is said first endpoint or said second endpoint.

* * * * *